(12) United States Patent
Castle

(10) Patent No.: US 7,145,456 B2
(45) Date of Patent: Dec. 5, 2006

(54) EFFICIENT ELECTRONICS FOR A WALK-THROUGH METAL DETECTOR

(75) Inventor: Jonathan Castle, Los Banos, CA (US)

(73) Assignee: Fisher Research Labs, Inc., El Paso, TX (US)

( * ) Notice: Subject to any disclaimer, the term of this patent is extended or adjusted under 35 U.S.C. 154(b) by 119 days.

(21) Appl. No.: 10/813,309

(22) Filed: Mar. 29, 2004

(65) Prior Publication Data

US 2004/0217861 A1    Nov. 4, 2004

Related U.S. Application Data

(60) Provisional application No. 60/466,839, filed on Apr. 29, 2003.

(51) Int. Cl.
*G08B 13/18* (2006.01)

(52) U.S. Cl. .................. 340/552; 340/551; 340/572.8; 324/345; 324/347

(58) Field of Classification Search ................ 340/552, 340/551, 572.7–8; 324/323, 326, 345, 347
See application file for complete search history.

(56) References Cited

U.S. PATENT DOCUMENTS

| | | | | |
|---|---|---|---|---|
| 4,470,015 A | * | 9/1984 | Hirschi et al. .............. | 324/329 |
| 4,507,612 A | * | 3/1985 | Payne ......................... | 324/329 |
| 4,539,558 A | * | 9/1985 | Fearon ..................... | 340/572.2 |
| 4,821,023 A | * | 4/1989 | Parks ......................... | 340/551 |
| 4,906,973 A | * | 3/1990 | Karbowski et al. ......... | 340/551 |
| 5,521,583 A | * | 5/1996 | Frahm et al. ............... | 340/551 |
| 5,841,346 A | * | 11/1998 | Park ........................... | 340/540 |
| 6,696,947 B1 | * | 2/2004 | Bybee ........................ | 340/551 |

* cited by examiner

*Primary Examiner*—Daniel Wu
*Assistant Examiner*—Travis Hunnings
(74) *Attorney, Agent, or Firm*—Schwabe, Williamson & Wyatt, P.C.

(57) ABSTRACT

A metal detection circuit that includes a power source and a connection to ground. At least one transmitter circuit is electrically coupled to the power source and ground and a transmit coil is electrically coiled to the transmitter circuit. At least one receiver coil has provided along with an amplifier to be electrically coupled to the receiver coil. An integrator is electrically coupled to the amplifier and a track/hold circuit is electrically to the integrator. A filter is electrically coupled to the track/hold circuit and an output. The circuit provides a high amplitude, low duty cycle excitation pulse, which allows for the sensitivity of a high level excitation signal with the power economy of a much lower energy excitation signal. The receiver circuit collects and conditions the signals resulting from the relatively short duration, large amplitude excitation pulse, and goes in to hold mode during the relatively long charge and idle periods.

22 Claims, 12 Drawing Sheets

EFFICIENT ELECTRONICS FOR A WALK-THROUGH METAL DETECTOR

CROSS-REFERENCES TO RELATED APPLICATIONS

This application is a non-provisional application and claims the benefit of Application No. 60/466,839, filed Apr. 29, 2003, entitled "Portable Walk Through Metal Detector and Method," which disclosure is hereby incorporated herein by reference for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

1. Field of the Invention

The present invention relates generally to walk through metal detectors for security applications and more specifically it relates to a portable walk through metal detector and method with interchangeable sensor panels and other structural members that can be quickly assembled, or disassembled and transported.

2. Description of the Prior Art

Walk through metal detectors have been in use for years. Typically, walk through metal detectors are comprised of metal detectors used in the pursuit of discovering metal objects carried by persons attempting to gain access to a specific area. These devices are even more important given today's security conscious climate.

The main problem with conventional walk through metal detectors is that they are heavy and difficult to move to various locations. Another problem with conventional walk through metal detectors is that they require additional equipment to make them mobile. Another problem with conventional walk through metal detectors is the power consumption of the electronic system limits the detectors ability to operate from a battery source for more than a few hours, requiring AC power to be accessible for either operation, or frequent battery recharging.

While these devices may be suitable for the particular purpose to which they address, they are not as suitable as a portable walk through metal detector with interchangeable sensor panels and other structural members that can be quickly assembled, or disassembled and transported. The main problem with conventional walk through metal detectors in portable applications is that they are heavy and difficult to move to various locations. Generally, conventional metal detectors' parts are too big to fit in an automobile. Thus, they require additional equipment to make them mobile. Also, another problem is the power consumption of the electronic system limits the detectors ability to operate from a battery source for more than a few hours, requiring AC power to be accessible for either operation, or frequent battery recharging.

SUMMARY OF THE INVENTION

In view of the foregoing disadvantages inherent in the known types of walk through metal detectors now present in the prior art, the present invention provides a new walk through metal detector with portable construction wherein the same may be utilized for rapid assembly, or disassembly and transport. Additionally, the present invention provides a detection system that operates for a relatively long period of time without the necessity of battery recharge or an available AC power source by providing a load duty circle, transmit pulse circuit for a portable walk through metal detector that provides an energy efficient detection system.

More particularly, the present invention provides a metal detection circuit that includes a power source. At least one transmitter circuit is electrically coupled to the power source while a transmit coil is electrically coupled to the transmitter circuit. At least one receiver coil is provided along with an amplifier to be electrically coupled to the receiver coil. An integrator is electrically coupled to the amplifier and a track/hold circuit is electrically coupled to the integrator. A filter is electrically coupled to the track/hold circuit and an output.

In accordance with one aspect of the present invention, the filter is a bandpass filter.

In accordance with another aspect of the present invention, the transmitter circuit comprises a charged coil circuit.

In accordance with a further aspect of the present invention, the circuit comprises two receiver coils each electrically coupled to the amplifier.

In accordance with yet another aspect of the present invention, the track/hold circuit comprises a first stage comprising an input resistor, an op-amp, an integrator capacitor, and a C-Mos SPDT switch, and a second stage comprising two passive RC filters and an op-amp buffer.

Thus, the present invention provides a modular walk-through metal detector comprising a plurality of separate sensor panels electrically coupled to each other and arranged one above the other along two separate sides to form two side walls and a top cross-member that engages each side wall. Preferably, at least one base member is provided that is coupled to the sidewalls. Each sensor panel includes a portion of a metal detection circuit as described above, i.e., some of the panels include a transmitter portion of the circuit while other panels include a receiver portion of the circuit. Thus, one sidewall is made up of transmitter panels while the other sidewall is made up of receiver or detector panels.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and implemented in various ways. Also, it is to be understood that the phraseology and terminology employed herein are for the purpose of the description and should not be regarded as limiting.

To the accomplishment of the above and related aspects of the present invention, the present invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF PREFERRED EXEMPLARY EMBODIMENTS

Figure 1:
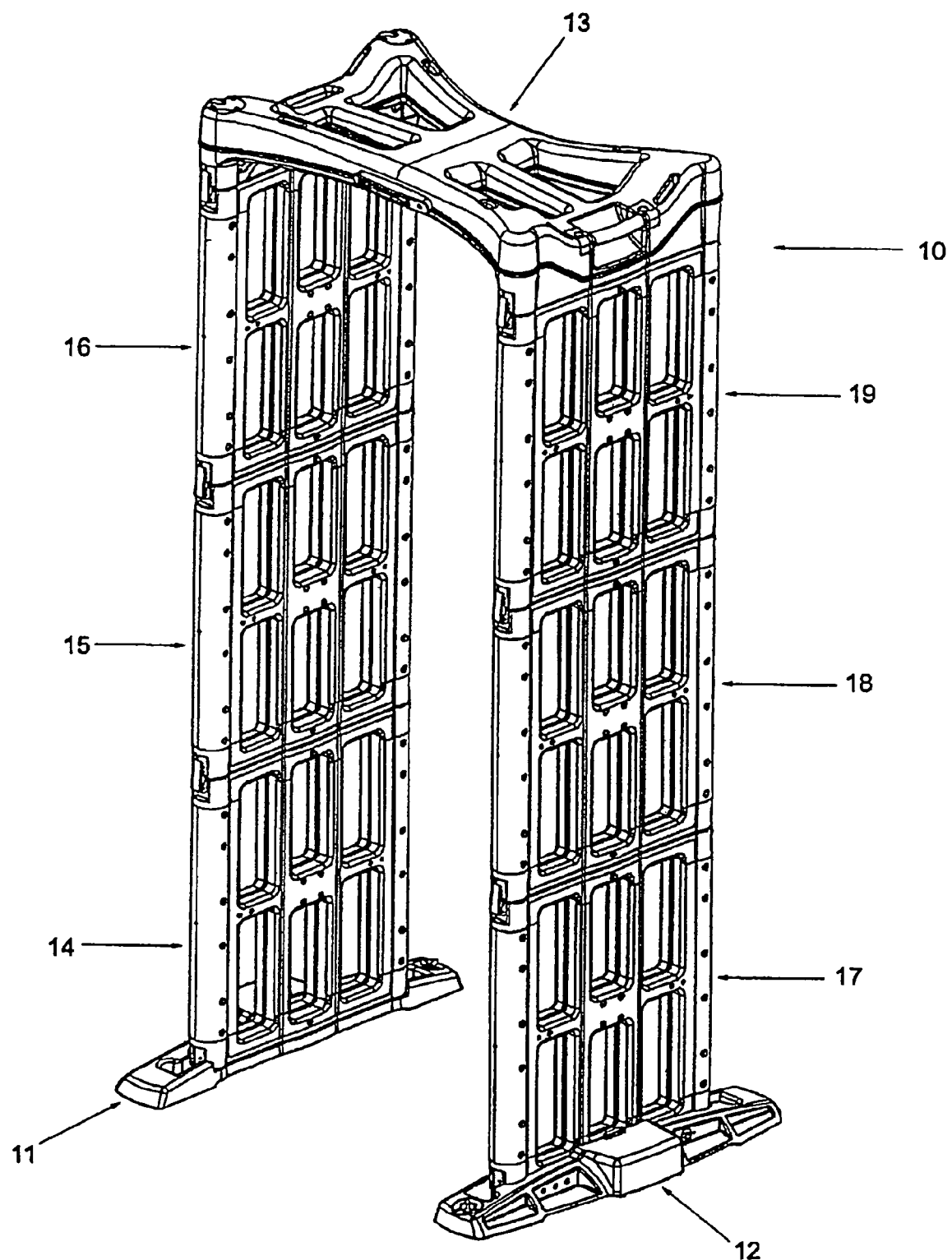
FIG. 1 is a diagram of a portable walk through metal detector fully assembled.

Turning now descriptively to the drawings, in which similar reference characters denote similar elements throughout the several views, the attached figures illustrate a walk through metal detector and method with portable construction wherein the same can be utilized for rapid assembly, or disassembly and transport, which comprises of two structural base members to anchor the archway, multiple sensor panels with which the sides of the archway are constructed, and a top cross-member to join and support the walls of the archway. The base members consist of a housing to provide contact with the ground, mechanical hardware and fittings to facilitate mounting of the sensor panels, rechargeable batteries to provide the system power source, and electronic connectors to pass signals from the base section to adjacent sensor panels. The sensor panels consist of a housing to provide structure for the sensor coils and electronics, mechanical hardware and fittings to facilitate mounting of adjacent panels and/or other structural members, sensor coil windings, electronic circuits to provide the coil excitation or to process the received signals, multi-color LED target indicators, pairs of infrared emitting and photo diodes to detect the presence and speed of persons passing through the detector archway, and electronic connectors to pass signals from the sensor panel to adjacent sections. The top cross-member consists of a housing to join and support the walls of the archway, mechanical hardware and fittings to facilitate mounting of the sensor panels, electronic circuits to provide the master processing of the metal detection system, input and output devices to provide the user with an interface for control and informational display, and electronic connectors to pass signals from the top section to adjacent sensor panels. In addition, the top cross-member provides a vehicle platform for moving a disassembled unit with built-in wheels, a handle, and stacking structures to support the other members.

The fully assembled portable walk through metal detector (10) preferably includes two base members (11 and 12), a top cross-member (13), and in this embodiment, six sensor panels (14–19), as shown in FIG. 1. The lower sensor panels (14 and 17) are mechanically mounted and fastened to each respective base member (11 and 12). In addition, when the sensor panel is properly mounted to the base member, an electrical connection is made as well, allowing signals to pass between each respective member. The lower sensor panels are also mechanically mounted and fastened to middle sensor panels (15 and 18), again providing electrical connection for signals to pass from member to member. The middle sensor panels are also mechanically mounted and fastened to upper sensor panels (16 and 19), again providing electrical connection between each respective member. Finally, the top cross-member (13) is mechanically mounted and fastened to each upper sensor panel, providing an electrical connection between the top and each respective upper panel.

Those skilled in the art will understand that more or fewer panels may be used as desired or needed, especially depending upon the dimensions of the panels. Likewise, there may be only one base member that would extend between the two side walls, or there may be none at all if the lower sensor panels are designed to support the assembled walk through metal detector. Additionally, there may be one or more top cross members.

Figure 2A:
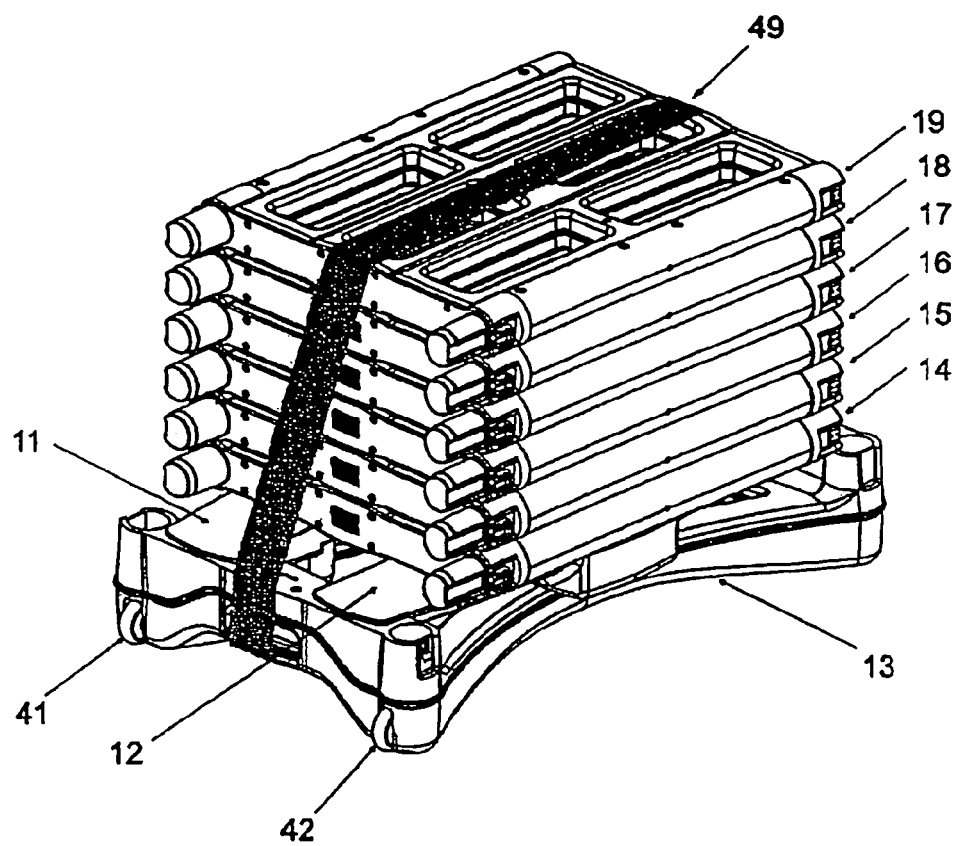
FIGS. 2a and 2b are diagrams of a portable walk through metal detector disassembled and ready for transport.
Figure 2B:
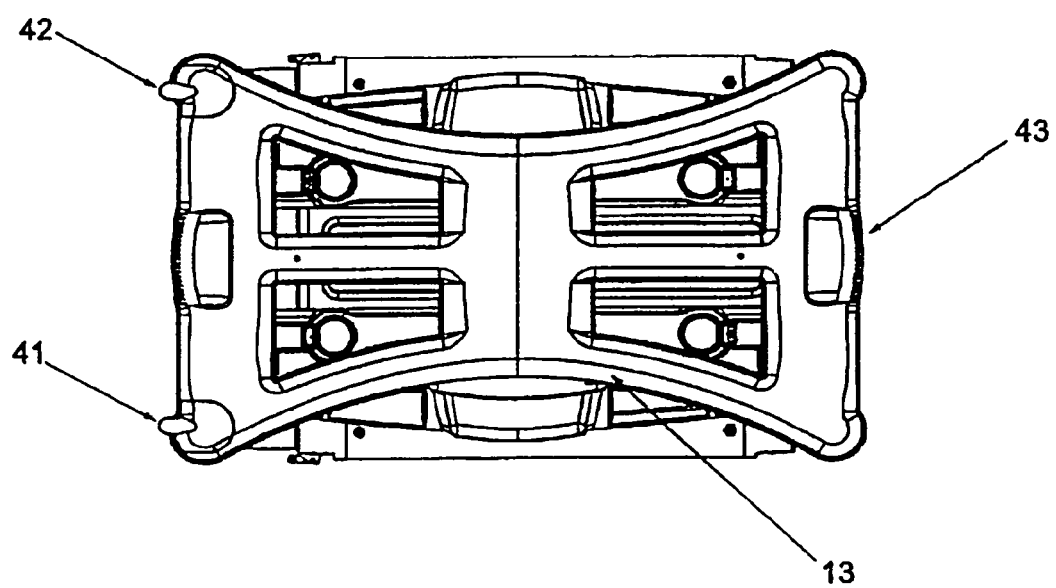

The disassembled portable walk through metal detector is shown in FIG. 2a, displaying the top cross-member (13) as a vehicle platform for moving a disassembled unit. The top member contains built-in features including wheels (41 and 42) and a handle (43), shown in FIG. 2b, to provide mobility. Referring back to FIG. 2a, stacking structures are provided to support other members as they are placed upon it for transport (detailed in FIG. 5). In this embodiment, the base members (11 and 12) are stacked upon the top cross-member, with the sensor panels (14–19) stacked on top, in no particular order. The disassembled unit is then fastened together for transport by a strap (49).

Figure 3A:
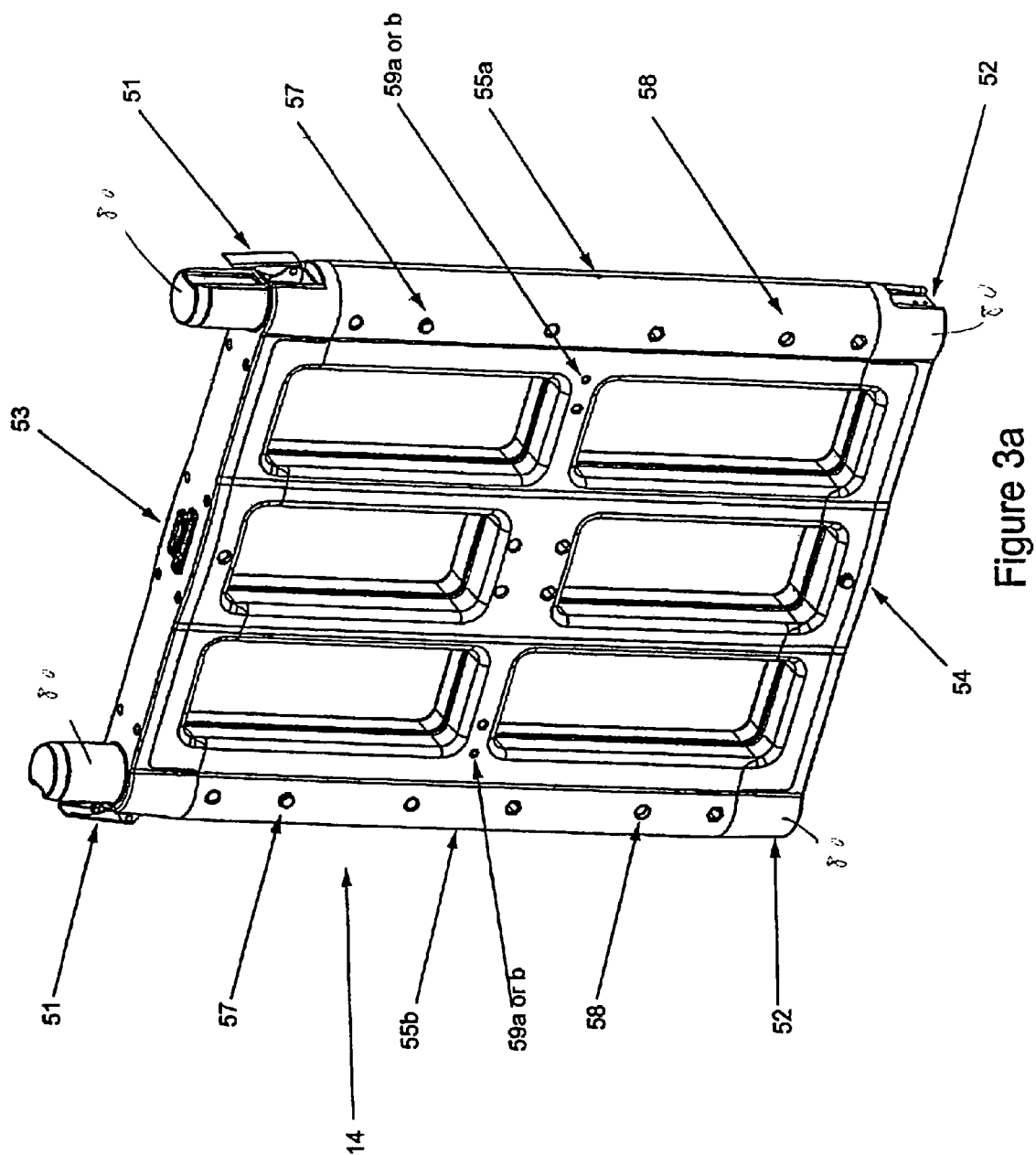
FIGS. 3a and 3b are diagrams of one embodiment of an individual sensor panel.
Figure 3B:
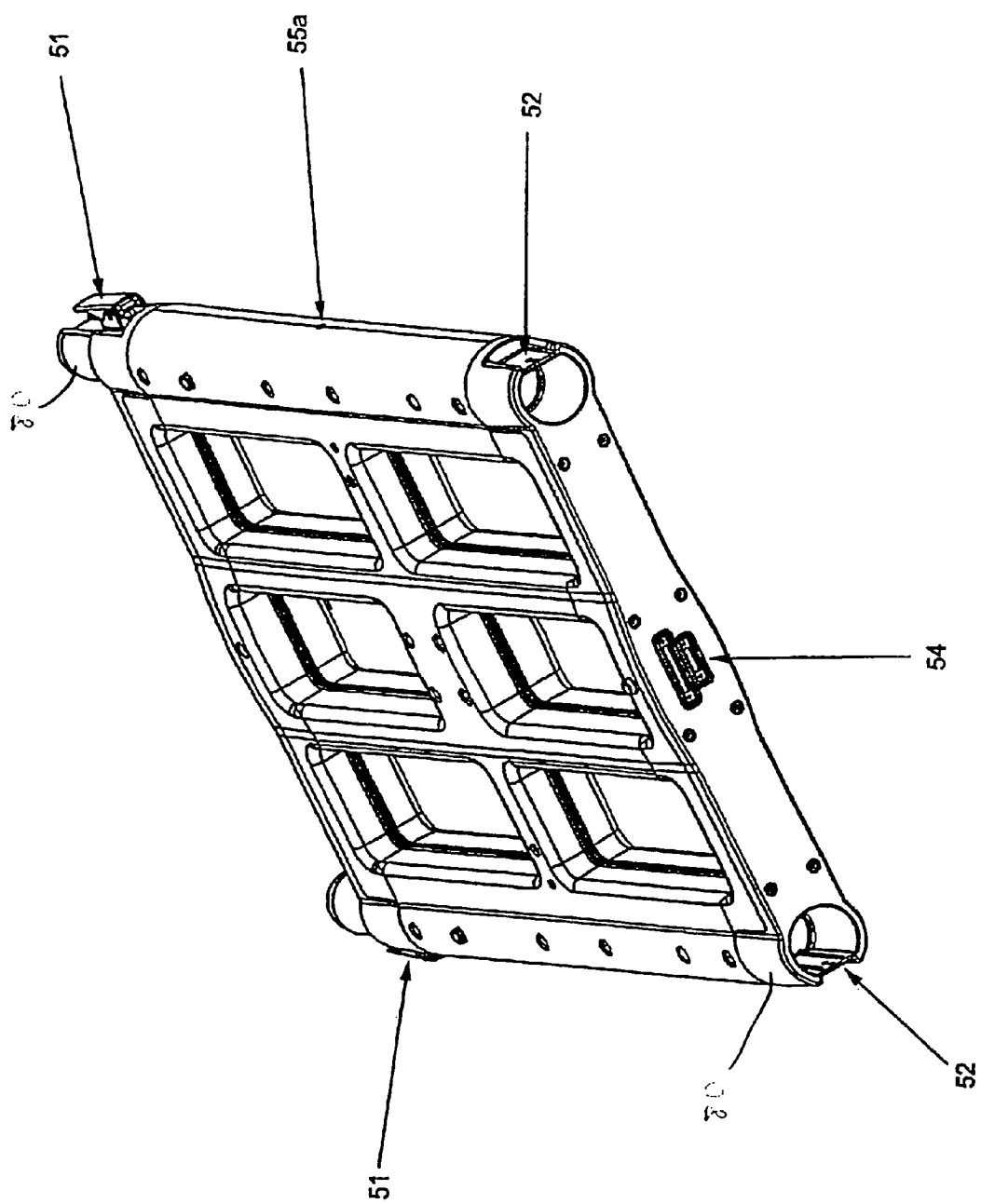

The sensor panel (14) is shown in FIGS. 3a and 3b. Each sensor panel contains fastening mechanisms on top (51) and bottom (52) to enable proper mechanical mounting to adjacent members. Each panel also possesses electrical connectors at the top (53), shown in FIG. 3a, and at the bottom (54), shown in FIG. 3b, to make proper contact for the passing of electronic signals from member to member. Each receiver panel contains two multi-color LEDs (55a,b) to provide detection information for each target that passes through the fully assembled unit, displaying at each edge of the panel. Each panel also contains either a pair of infrared LEDs (59a), or a pair of photo diodes (59b), to detect the presence and speed of persons passing through the detector archway. Each of the sensor panels possess stacking structures on the exterior of the housing (57 and 58) to enable each panel to be properly fitted when the unit is fully disassembled and stacked for transport (refer to FIG. 2). Each of the sensor panels in this embodiment (14–19) is identical mechanically. Inside each sensor panel, the electronic detection systems, of which one embodiment is described by FIGS. 6a and 6b, is contained.

Figure 4:
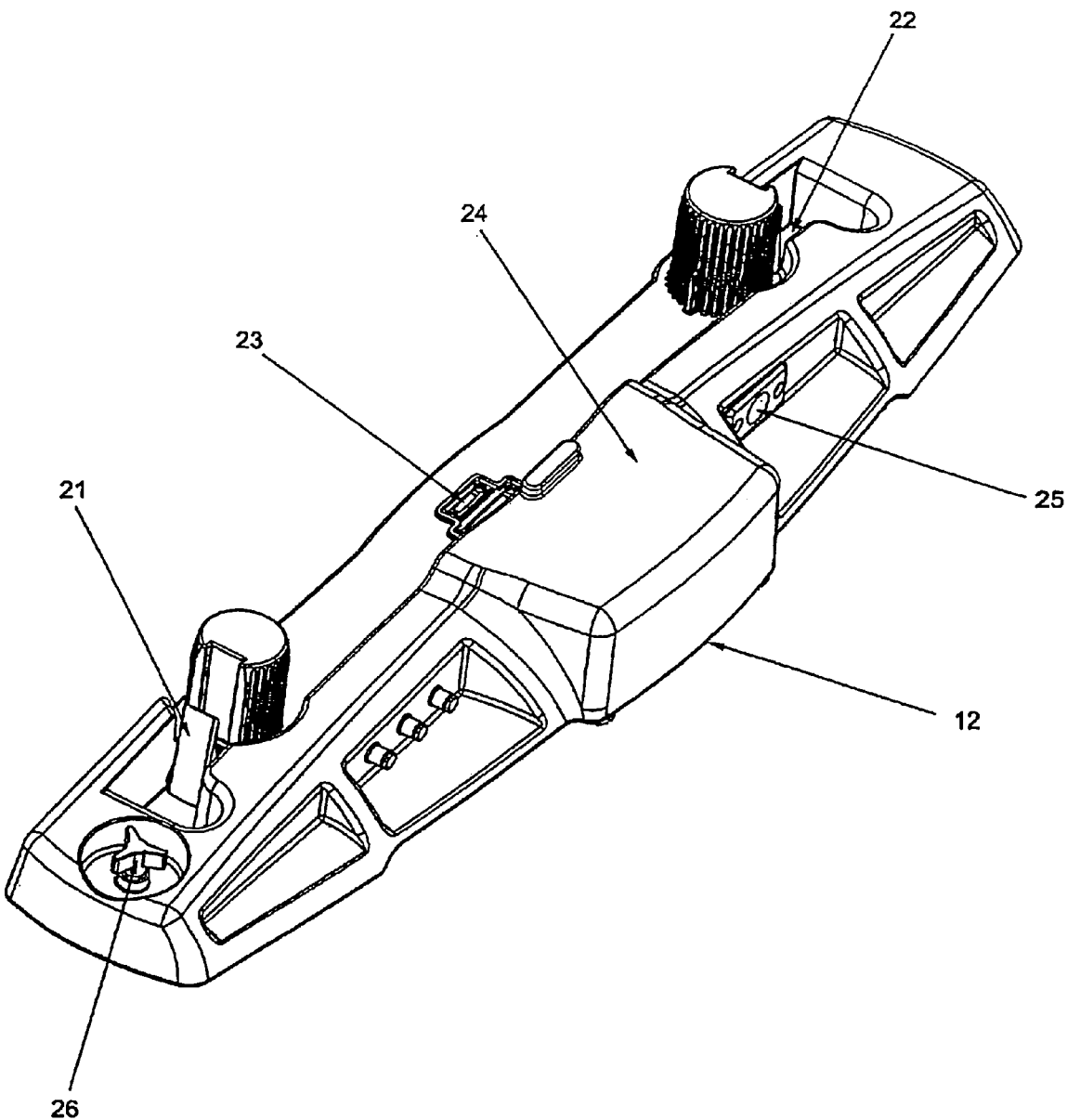
FIG. 4 is a diagram of one embodiment of a base member.

A base member (12) is shown in FIG. 4. Each base member contains fastening mechanisms (21 and 22) to enable proper mechanical mounting to the sensor panel that rests upon it. Each base member also possesses an electrical connector (23) to make proper contact for the passing of electronic signals between the base member and sensor panel. Each base also contains a rechargeable battery (24) contained inside, a recharge connector (25), and a leveling mechanism (26) to provide physical stability of the fully assembled unit when resting on an uneven surface.

Figure 5A:
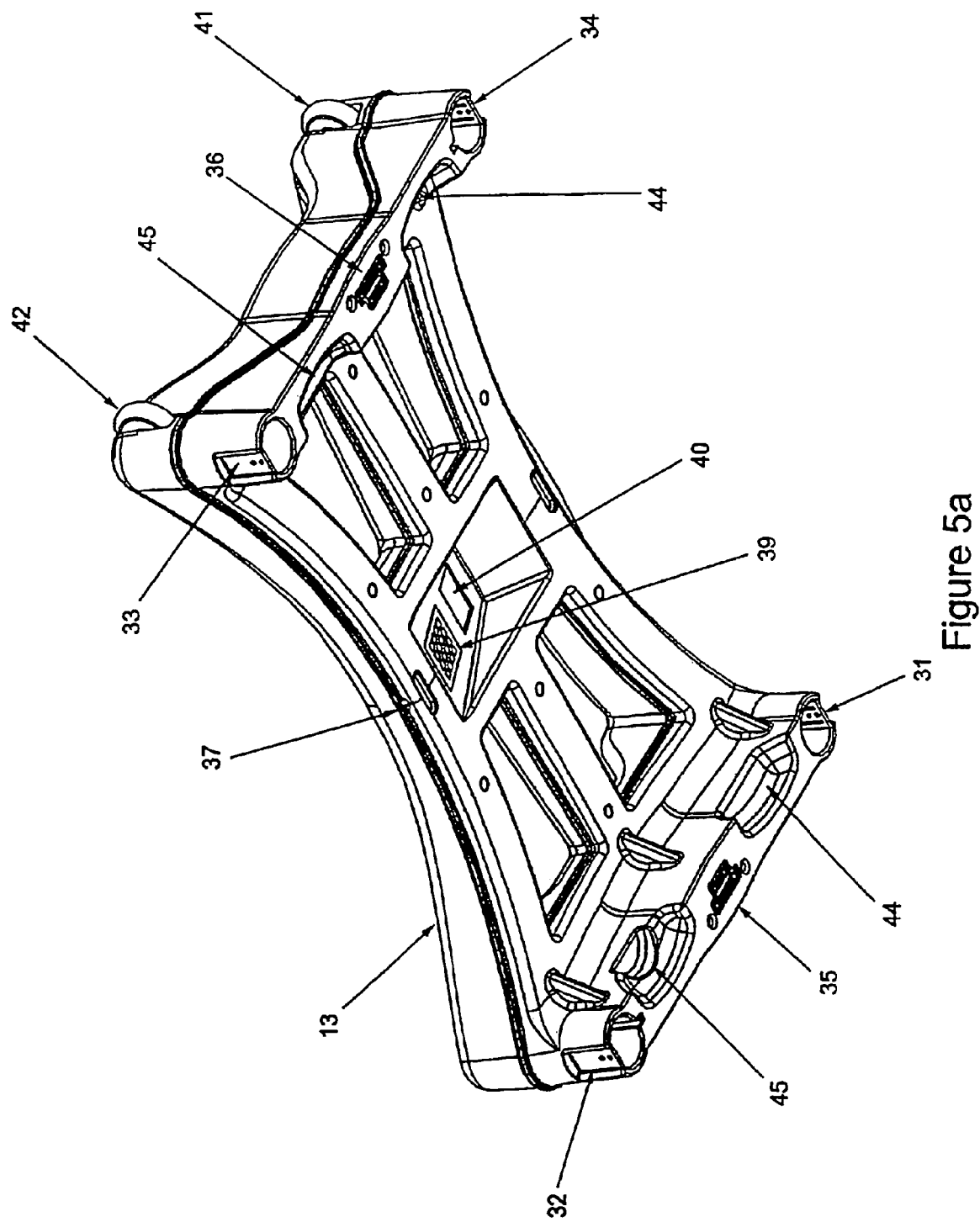
FIGS. 5a and 5b are diagrams of one embodiment of a top member.
Figure 5B:
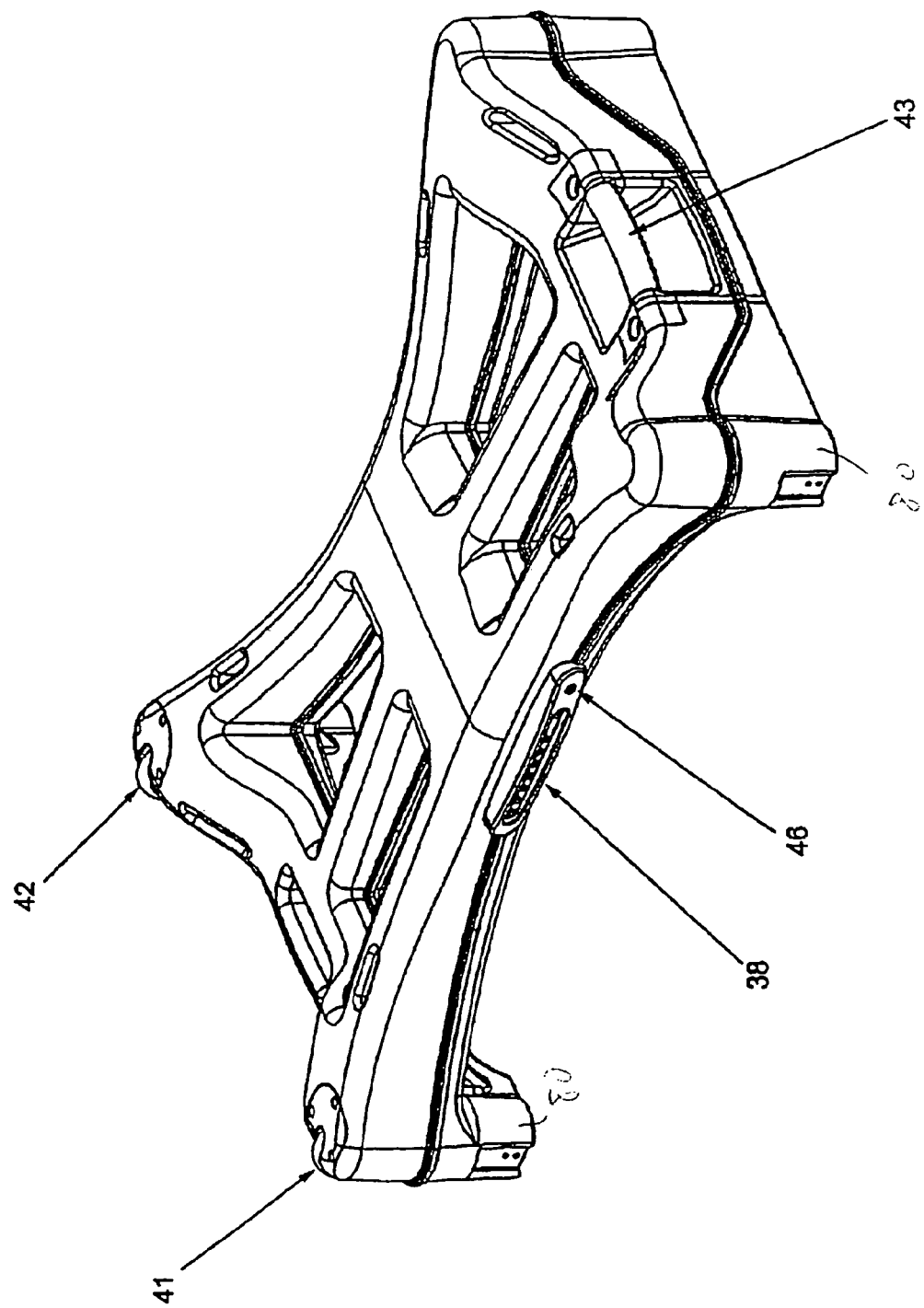

The top cross-member (13) is shown in FIGS. 5a and 5b. The top member contains fastening mechanisms (31–34) to enable proper mechanical mounting to the upper sensor panels underneath. The top member also possesses two electrical connectors (35 and 36) to make proper contact for the passing of electronic signals to and from each upper sensor panel. The top member contains a multi-color entry LED (37) to notify those about to enter the portable walk through metal detector when to proceed (green light) and when to wait (red light), shown in FIG. 5a. The presence and size of a target is indicated by a LED bar graph (38), shown in FIG. 5b. An audio alert is also provided to enunciate the presence of a detected target with a speaker or piezo device (46). The control of the detector is accomplished with a keypad (39) and a LCD display (40), shown in FIG. 5a. The top member contains built-in features including wheels (41 and 42), shown in FIG. 5a, and a handle (43), shown in FIG. 5b, to provide mobility. In addition, stacking structures (44 and 45) are provided to support other members as they are placed upon it for transport.

Figure 6A:
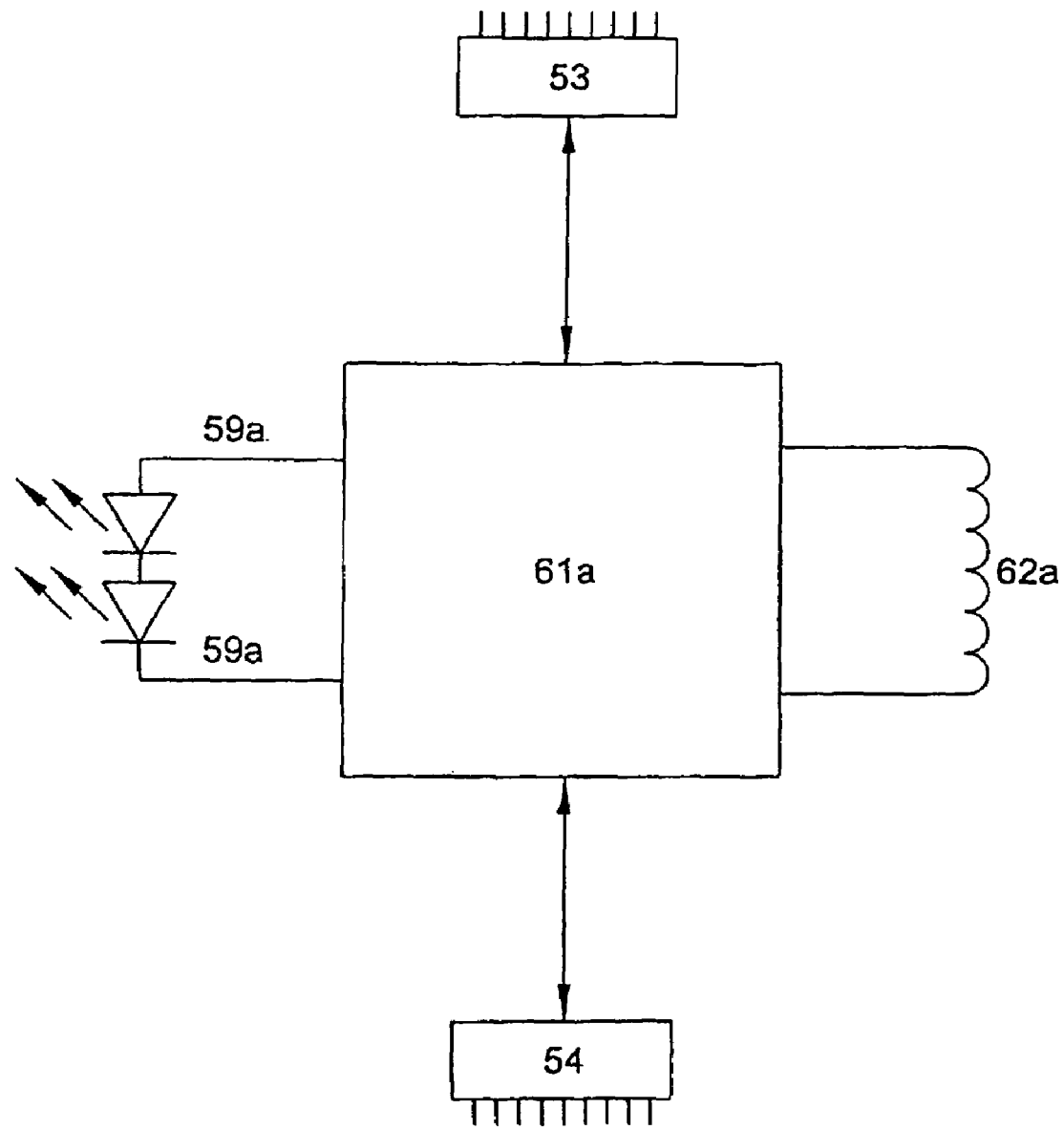
FIGS. 6a and 6b are block diagrams of one embodiment of transmitter and receiver sensor panel circuits, coils, and connector systems, respectively.
Figure 6B:
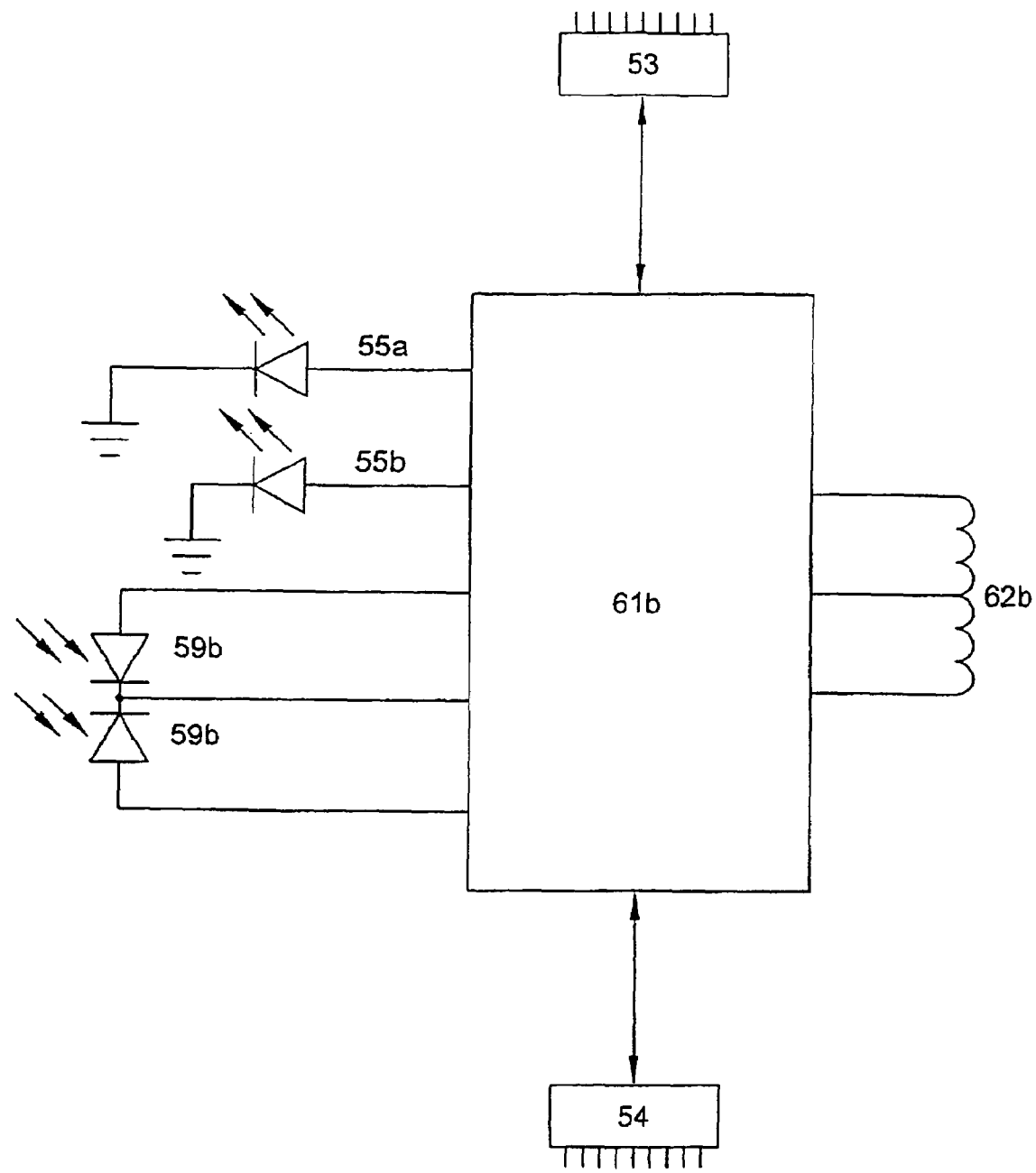

One embodiment of an electronic metal detection system is shown in FIGS. 6a and 6b. This type of electronic system is contained inside the sensor panels. Referring to FIG. 6a, the transmitter circuit (61a) is connected to an inductive coil of wire (62a). The coil will be energized by the transmit circuit to produce a magnetic field which can effect metal targets in proximity of the coil. In addition, a pair of infrared LEDs (59a) will provide infrared beams to enable the detection and speed of objects passing between transmit and receive panels. Referring to FIG. 6b, the receiver circuit (61b) is connected to a pair of inductive coils of wire (62b). The coil pair will have an electronic signal induced in it when a magnetic field, emanating from a metal target, is in proximity of the coil. A pair of photo diodes (59b) detect the presence and speed of persons passing through the detector archway, by monitoring infrared beams from the transmitter system. The presence of a target is indicated by the multi-color LEDs (55a,b). In both transmitter and receiver sensor systems, signals are passed to and from the circuit of one sensor panel to another adjacent member by connectors (53 and 54).

Referring to FIG. 1 and the brief description above, the physical interconnections of the main components and sub-components of this invention are evident. The sensor panels (reference FIG. 3) are stacked upon the base members (reference FIG. 4). The additional sensor panels are stacked upon each other, in no particular order. The top cross-member (reference FIG. 5) is attached to the upper sensor panels to join and support the archway. Each individual member is connected to an adjacent member both mechanically, with fasteners, and electrically, with electronic connectors. The mechanical connection provides mechanical stability, and the electronic connectors provide an electronic signal path to each member.

Figure 7:
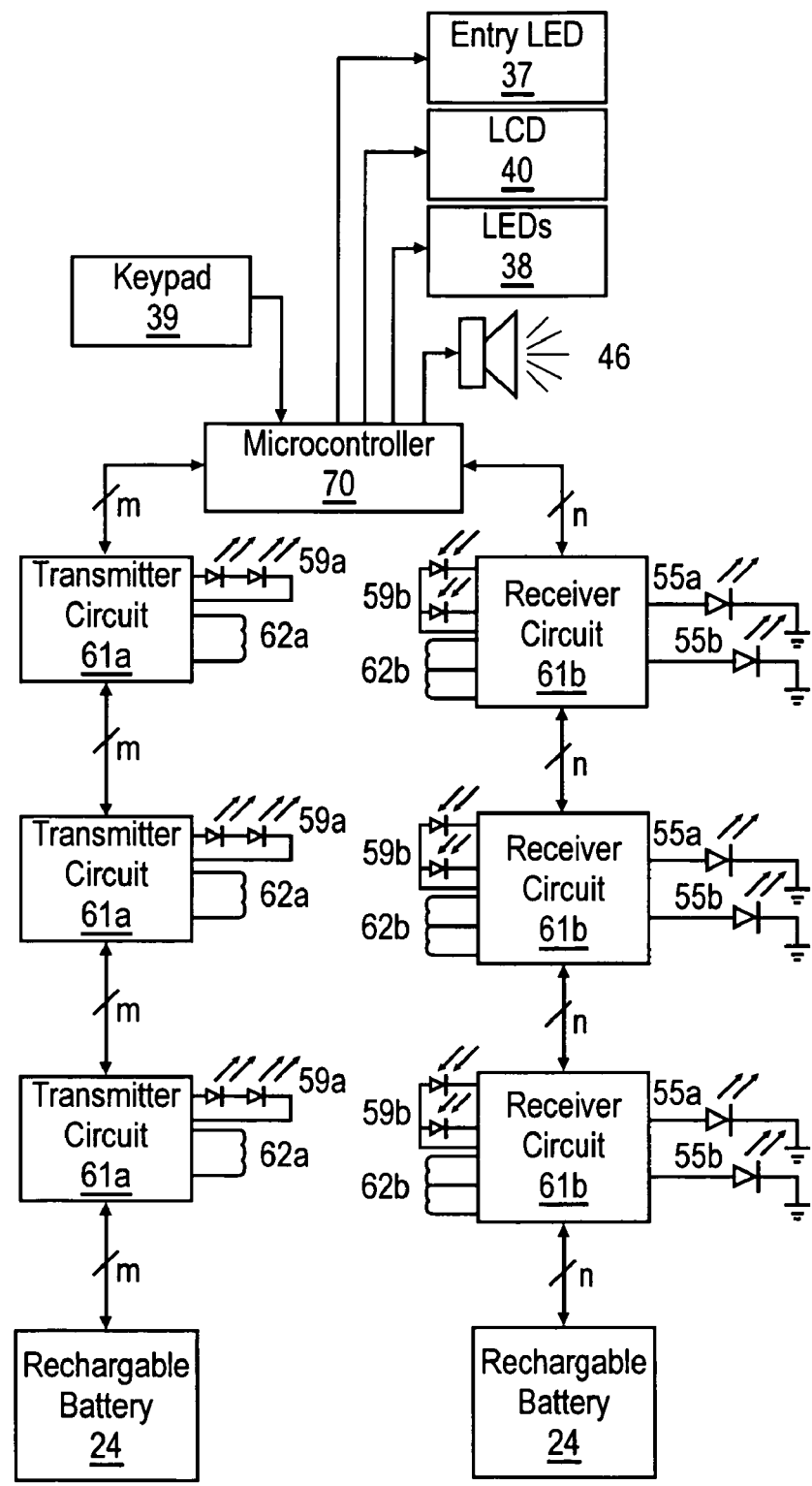
FIG. 7 is a block diagram of one embodiment of the metal detection system.

Referring to FIG. 7, the electronic interconnections of the main components and subcomponents of this invention are evident. The rechargeable batteries (24) contained in the base members supply the power for the metal detection system. A number of contacts for each connector are required to pass the power, ground, analog, and digital signals from member to member. In the embodiment shown in FIG. 7, the transmit chain (shown on the left side of the drawing) requires "m" contacts at each connector to pass the necessary signals to each of the transmitter circuits (61a). As described in FIG. 6, the transmit coils (62a) will be energized by the transmitter circuits at the appropriate times. The timing for the transmit pulses is controlled by the microcontroller (70), which also uses a portion of the "m" lines to communicate with each of the transmitter circuits. A portion of these lines can also be used for addressing and identification of each transmit module, allowing the microcontroller (70) to automatically identify the position of each transmitter sensor panel (top, middle, or bottom). The infrared LEDs (59a) emit an infrared beam that will be sensed by a receiver module located directly across the archway.

On the right side of FIG. 7, the receive chain uses "n" lines (and contacts between members) to pass the necessary signals (power, ground, analog, and digital) to each of the receiver circuits (61b). A portion of these lines can also be used for addressing and identification of each receive module, allowing the microcontroller (70) to automatically identify the position of each receiver sensor panel (top, middle, or bottom). As described in FIG. 6, the receiver coils (62b) will have an electronic signal induced in them when a magnetic field emanating from a metal object is in proximity to the coils.

This signal is processed by the receiver circuit (61b) and communicated to the microcontroller (70). In addition, the photo diodes (59b) will detect when the infrared beam from the transmitter panel located directly across is broken by something passing through the archway, and communicate this to the microcontroller as well. The presence of a target signal is displayed by the multicolored LEDs (55a,b) in each affected member. In addition, the microcontroller (70) will cause an audio alert in a speaker (46), and a signal strength bar-graph display (38). The microcontroller (70) will also control the color of the entry LED (37) that indicates activity status of the detector (for example, the LED will be green if the detector is ready to accept a new entry, yellow if the detector is busy processing a recent signal, and red if a metal target is detected). Finally, the keypad (39) and LCD (40) allows the user to turn the detector on or off, and adjust detector settings (for example, sensitivity and volume levels). The system can restrict access to detector settings by unauthorized personnel through the use of passwords.

As mentioned above, the core of this invention is the portability of the walk through metal detector provided by a combination of physical and electrical features. Referring to FIG. 1, a physical feature of this detector that provides portability is the stacking design of each individual member. In this embodiment, the nine members are placed in the upright position by stacking each member from the base up, and securing the members with the fastening mechanisms. This allows the unit to be assembled rapidly.

Additionally, each sensor panel housing is identical physically (refer to FIG. 3), and therefore, no particular ordering of sensor panels on any given side is necessary. Each individual transmit sensor panel is interchangeable with any other transmit panel; likewise, each individual receive panel is interchangeable with any other receive panel. This provides for rapid assembly of the standing unit, because there is no restriction of assembly position. This also allows rapid repair through the replacement of any panel as necessary, since the panels are completely modular.

FIGS. 1 and 3 show the sensor panel construction includes windowed cut outs (six per panel in this embodiment), improving the portability of this invention by reducing the weight of each panel. In addition, the windowed design provides less wind resistance and provides visibility into the standing unit for security personnel to better examine the people being screened by the portable walk through metal detector.

The embodiment shown in FIG. 1 is preferably a rugged, weatherproof design that allows portability in outdoor environments, including rain and extreme temperatures. For example, preferably, top cross-member (13) is made from injection molded ABS/Polycarbonate with UV stabilization and UL recognized fire retardant properties and is sealed with silicon gasket/sealing goop. Panels (14–19) and base members (11, 12) are preferably made of the same ABS/Polycarbonate material, but do not need to be sealed. Since the inter-panel connectors are surface mounted, they present a barrier to water that keep most of the water out of the panels if the unit were left disassembled out in the rain. The connector areas themselves (51,52) is preferably ringed with interlocking baffles (80) molded into the panels' ends. The baffles help prevent sprayed water or driving rain from getting to the contacts and possibly impairing performance while the unit is assembled and in operation.

As noted previously, the panels' halves include a tongue and groove type design about their perimeters that acts to impede, but not completely block, the ingress of sprayed water or driving rain. The circuitry within the panels that could be sensitive to moisture is encapsulated in sealant to protect it from any moisture that finds its way inside the panels. The base members preferably contain no sensitive electronics, and thus, there is preferably nothing in them that requires moisture protection. The panels and bases preferably include drain holes in them through which condensation, or any other water that finds its way inside, can drain. This helps ensure that these components won't have standing water build up inside. The batteries are preferably sealed in plastic by the manufacturer, and thus, are not damaged by moisture. The batteries terminals are generally too far apart for sprayed water to effectively short them out since they are preferably low voltage batteries. The preferred batteries resemble typical small craft batteries such as motorcycle batteries.

Recharge connector socket (25) for receiving a cable from a battery charger (not shown) preferably includes an integral sealed cover. The internal contacts' spacing of the charger is so great that it does not present a problem for a 12 volt system even if they do get wet. Preferably, these sockets are cigarette lighter type sockets manufactured for use on personal watercraft.

The battery charger is preferably a stand-alone device and is preferably built into a sealed 'nema4X' rated die cast aluminum box. The cabling going in and out is sealed with appropriate standard, waterproof cable grommets with integral strain relief. The internal circuitry has independent and redundant passive and active output short circuit protections. The internal transformer is certified by all international agencies for safety and is power limited by design, so that it cannot produce dangerously high power levels.

Finally, if used outdoors in direct sunlight, where temperatures may rise well above 180 Degrees Fahrenheit, the portable walk through metal detector may need to be shaded for reliable operation. Otherwise, the rated operating temperatures of some of its standard commercial electronic components may be exceeded. However, under such conditions, any attendant operators will require some shade as well. The components themselves can easily withstand storage at those elevated temperatures. Thus, the unit may safely be left out in the sun.

Referring to FIG. 2a, it is evident that the modular design of the members allow for the rapid disassembly and transport of this invention as well. The members readily stack upon each other with the top member forming a platform for the bases, and then the panels to be stacked. In addition, the inclusion of the wheels and handle on the top member (refer to FIG. 5b) provide a self-contained transport mechanism. The members can be strapped together after stacking, and the disassembled unit can be rolled to another location without requiring additional equipment for transportation.

Once the portable walk through metal detector is physically assembled, as shown in FIG. 1, the detection system can operate as described next. The control keypad (item 39 in FIG. 5a) is used to turn the detector on. The microcontroller initiates a selftest/self-diagnosis routine to ensure that all members are properly functioning. The results of this self-test are displayed on the LCD (item 40 in FIG. 5a). The user can enter a password to gain access to an on-screen menu that allows various attributes of the detectors performance to be modified (such as sensitivity to targets, volume of audio target alert), or access to statistical information (such as a transit counter) at any time. Upon completion of user settings or upon power-up, the unit will begin detecting by providing excitation signals to the transmitter coils, and monitoring both the receiver coil response and the status of the photo-receiver diodes on the interior of the archway. A valid target signal is obtained when both a signal is sensed by a receiver module, and an infrared beam has been broken by an object passing through the archway. This valid target can be displayed in various ways. The LED bar-graph (item 38 in FIG. 5b) can show signal strength of the received signal with multi-colored LEDs. The speaker or piezo element (item 46 in FIG. 5b) can provide an audio alert. The multi-color LED pairs on each side of the receiver sensor panels (items 55a,b in FIG. 3a) can also reveal where in the archway the target(s) were detected, showing red or yellow in the module zone(s) in which a target was detected by that module's receiver electronics, and the LCD (40) can display the type of alarm condition. These multi-color LED pairs preferably also reveal how large detected signals are, by using different colors to correspond to different signal strengths (for example, green=no target detected, yellow=small target detected, and red=large target detected). Preferably, the red LEDs are powered or lit if an object is detected regardless of the object's size. The yellow LEDs will preferably light only if multiple panels detect an object.

Figure 8:
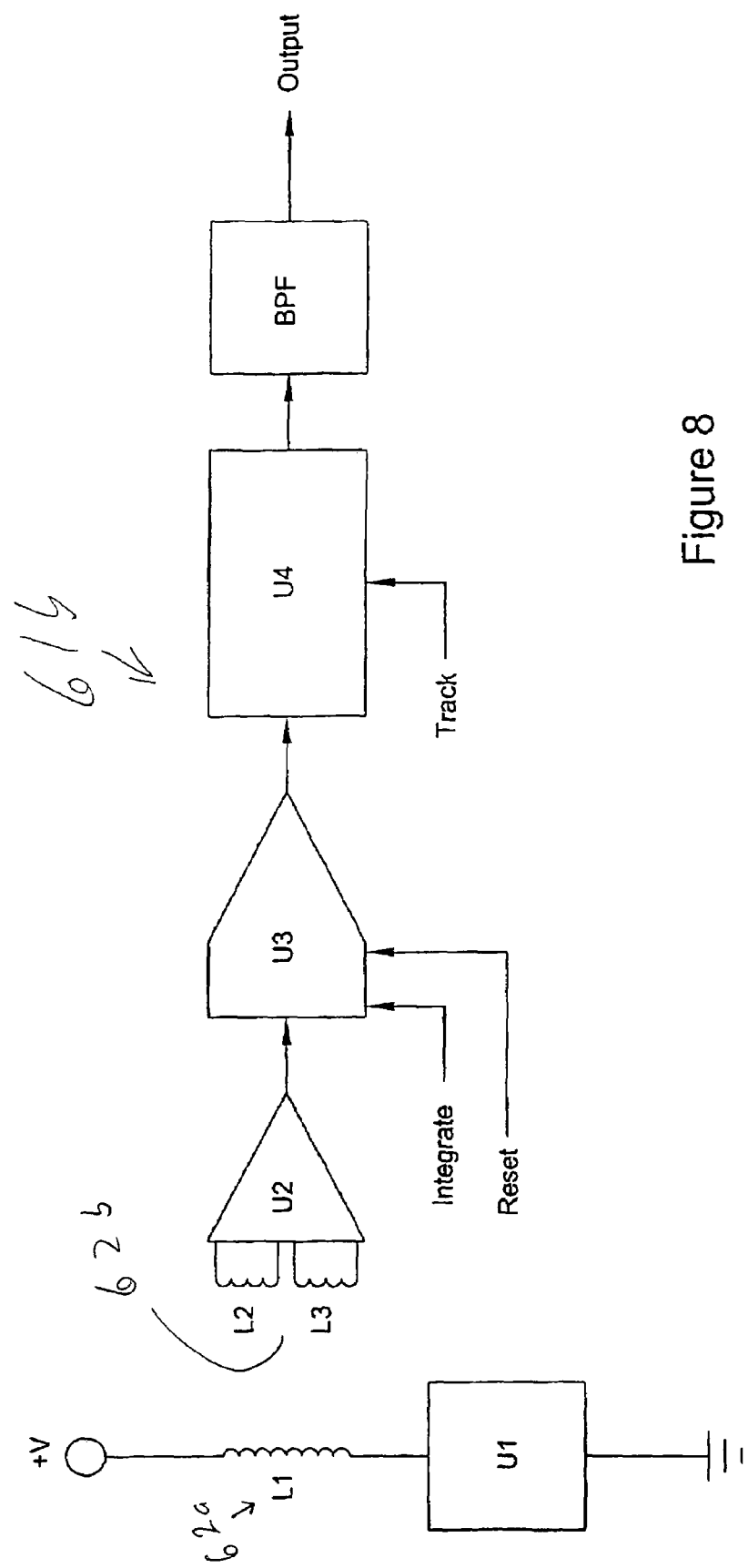
FIG. 8 is a detailed block diagram of the low duty cycle, detection circuit.
Figure 9:
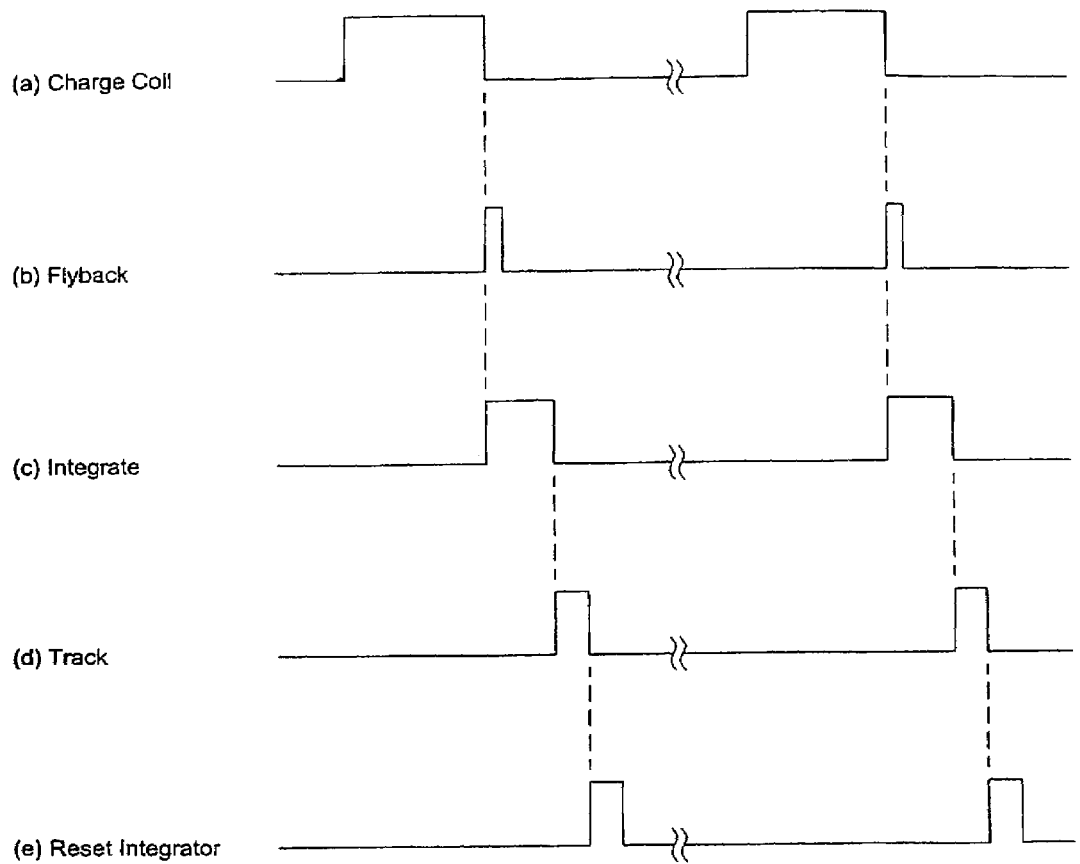
FIG. 9 is waveform diagram of the low duty cycle, detection circuit.

A critical aspect of this invention is also the ability of the detection system to operate for a relatively long period of time without the necessity of battery recharge or an available AC power source. The high amplitude, low duty cycle, transmit pulse circuit described next makes this portable walk through metal detector an energy efficient detection system. Referring to the circuit block diagram of FIG. 8 and the corresponding waveform diagram of FIG. 9, note that U1 and L1 are the transmitter circuit and transmit coil, respectively. More specifically, U1 is a coil charge circuit that charges the coil to a high current level, during the period shown in FIG. 9a. During the flyback period (refer to FIG. 9b) and for a period of time after, the resultant received signal is integrated (FIG. 9c). Referring to FIG. 8, the receive signal is induced into receiver coils L2 and L3, amplified by U2, and then integrated by U3. The integrator output is captured by a track/hold circuit (U4), and filtered by a bandpass filter (BPF) to provide a receiver output. Upon output, the integrator is reset for the next sampling cycle; however, the track/hold circuit allows a long idle time before needing to go through another charge integrate-track cycle to refresh the output. The benefit of this system is providing the signal strength of a high voltage excitation level at a fraction of the power consumed by an equivalent continuous wave excitation system. The ratio of charge to idle time (duty cycle) can be very small (much less than 50%).

As an example, the track/hold circuit preferably includes a first stage that includes an input resistor, an op-amp, an integrator capacitor, and a C-Mos SPDT switch, and a second stage that includes two passive RC filters, another C-Mos switch, and an op-amp buffer. Also as an example, the coil charge circuit preferably includes a power mosfet switch that connects a voltage supply across the transmit coil. While this switch is on, the coil charges. A high energy pulse is produced by the charged coil for a short period (for example, approximately ten microseconds) immediately after turning the switch off. This occurs because the stored field in the charged coil is allowed to collapse quickly. A high voltage zener diode clamps the voltage amplitude of this high energy pulse to provide a controlled energy release of the stored field by the standard formula E=L (di/dt) which relates the rate of current change in a coil to the voltage across it.

Thus, the present invention provides a metal detection circuit that provides a high amplitude, low duty cycle excitation pulse, which allows for the sensitivity of a high level excitation signal with the power economy of a much lower energy excitation signal. The receiver circuit portion collects and conditions the signals resulting from the relatively short duration, large amplitude excitation pulse, and goes in to hold mode during the relatively long charge and idle periods.

With respect to the above description then, it is to be realized that the suitability of dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A metal detection circuit comprising:
   a power source;
   at least one transmitter circuit electrically coupled to the power source;
   a transmit coil electrically coupled to the at least one transmitter circuit;
   at least one receiver coil;
   an amplifier electrically coupled to the at least one receiver coil;
   an integrator electrically coupled to the amplifier;
   a track/hold circuit electrically coupled to the integrator, the track/hold circuit comprising a first stage that includes an input resistor, an op-amp, an integrator capacitor, and a CMOS SPDT switch, and a second stage that includes two passive RC filters and an op-amp buffer; and
   a filter electrically coupled to the track/hold circuit and an output.

2. A circuit in accordance with claim 1 wherein the filter is a bandpass filter.

3. A circuit in accordance with claim 1 wherein the transmitter circuit comprises a coil charge circuit.

4. A circuit in accordance with claim 1 comprising two receiver coils each electrically coupled to the amplifier.

5. A circuit in accordance with claim 1 wherein the power source comprises a voltage source in the form of one of a battery, a battery of solar cells, a standard A/C source or a generator.

6. A metal detection circuit arrangement for a portable walk-through metal detector comprising a plurality of opposing pairs of sensor panels, each sensor panel pair comprising a circuit portion comprising:
   at least one transmitter circuit electrically coupled to the power source;
   a transmit coil electrically coupled to the at least one transmitter circuit;
   at least one receiver coil;
   an amplifier electrically coupled to the at least one receiver coil;
   an integrator electrically coupled to the amplifier;
   a track/hold circuit electrically coupled to the integrator, the track/hold circuit comprising a first stage that includes an input resistor, an op-amp, an integrator capacitor, and a CMOS SPDT switch, and a second stage that includes two passive RC filters and an op-amp buffer; and
   a filter electrically coupled to the track/hold circuit and an output.

7. A circuit arrangement in accordance with claim 6 wherein the filter is a bandpass filter.

8. A circuit arrangement in accordance with claim 6 wherein the transmitter circuit comprises a coil charge circuit.

9. A circuit arrangement in accordance with claim 6 wherein each circuit portion comprises two receiver coils each electrically coupled to the amplifier.

10. A circuit arrangement in accordance with claim 6 further comprising a power source comprising at least one voltage source in the form of one of a battery, a battery of solar cells, a standard A/C source or a generator.

11. A modular walk-through metal detector comprising:
   a plurality of separate sensor panels arranged in opposing pairs electrically coupled to each other and arranged one above the other along two separate sides to form two side walls; and
   at least one top cross-member that engages each side wall;
   wherein each opposing sensor panel pair comprises a circuit portion comprising:
   at least one transmitter circuit electrically coupled to the power source;
   a transmit coil electrically coupled to the at least one transmitter circuit;
   at least one receiver coil;
   an amplifier electrically coupled to the at least one receiver coil;
   an integrator electrically coupled to the amplifier;
   a track/hold circuit electrically coupled to the integrator, the track/hold circuit comprising a first stage that includes an input resistor, an op-amp, an integrator capacitor, and a CMOS SPOT switch, and a second stage that includes two passive RC filters and an op-amp buffer; and
   a filter electrically coupled to the track/hold circuit and an output.

12. A metal detector in accordance with claim 11 wherein the filter is a bandpass filter.

13. A metal detector in accordance with claim 11 wherein the transmitter circuit comprises a coil charge circuit.

14. A metal detector in accordance with claim 11 wherein each circuit portion comprises two receiver coils each electrically coupled to the amplifier.

15. A metal detector in accordance with claim 11 further comprising a power source comprising at least one voltage source in the form of one of a battery, a battery of solar cells, a standard A/C source or a generator.

16. A metal detector in accordance with claim 11 wherein each opposing sensor panel pair is interchangeable.

17. A metal detector in accordance with claim 11 further comprising at least one base coupled to each side wall.

18. A metal detector in accordance with claim 11 wherein the base comprises at least two base members.

19. A metal detector in accordance with claim 11 wherein the metal detector comprises six sensor panels, each side wall comprising three sensor panels.

20. A metal detector in accordance with claim 11 wherein each sensor panel comprises windowed areas.

21. A metal detector in accordance with claim 20 wherein each sensor panel comprises a weather-proof construction.

22. A metal detector in accordance with claim 11 wherein the sensor panels may be stored in the top cross-member and the top cross member includes at least one handle and at least two wheels.

* * * * *